(12) United States Patent
Misawa

(10) Patent No.: US 7,637,674 B2
(45) Date of Patent: Dec. 29, 2009

(54) IMAGE PICKUP APPARATUS

(75) Inventor: Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 315 days.

(21) Appl. No.: 11/517,324

(22) Filed: Sep. 8, 2006

(65) Prior Publication Data
US 2007/0058972 A1 Mar. 15, 2007

(30) Foreign Application Priority Data
Sep. 12, 2005 (JP) ............................. 2005-263851

(51) Int. Cl.
G03B 17/00 (2006.01)
(52) U.S. Cl. ...................................... 396/420; 348/376
(58) Field of Classification Search ................. 396/541, 396/420–426; 348/360, 373–376
See application file for complete search history.

(56) References Cited

U.S. PATENT DOCUMENTS 5,107,287 A * 4/1992 Swayze ........................ 396/424

2004/0062545 A1 * 4/2004 Ushiro ......................... 396/529
2004/0183942 A1 * 9/2004 Holmberg ................... 348/373

FOREIGN PATENT DOCUMENTS

| JP | 2003-156790 A | 5/2003 |
| JP | 2004-350047 A | 12/2004 |

* cited by examiner

Primary Examiner—W. B. Perkey
Assistant Examiner—Fang-Chi Chang
(74) Attorney, Agent, or Firm—Sughrue Mion, PLLC

(57) ABSTRACT

An image pickup apparatus, comprising:
   a lens unit,
   a grip unit which can be attached and detached to/from the lens unit and forms all or a part of a grip when photographing,
   a guiding member which, being set on the lens unit, guides the grip unit in a direction approximately orthogonal to an optical axis of the lens unit; and
   a guided member which is set on the grip unit and engaged with the guiding member.

6 Claims, 13 Drawing Sheets

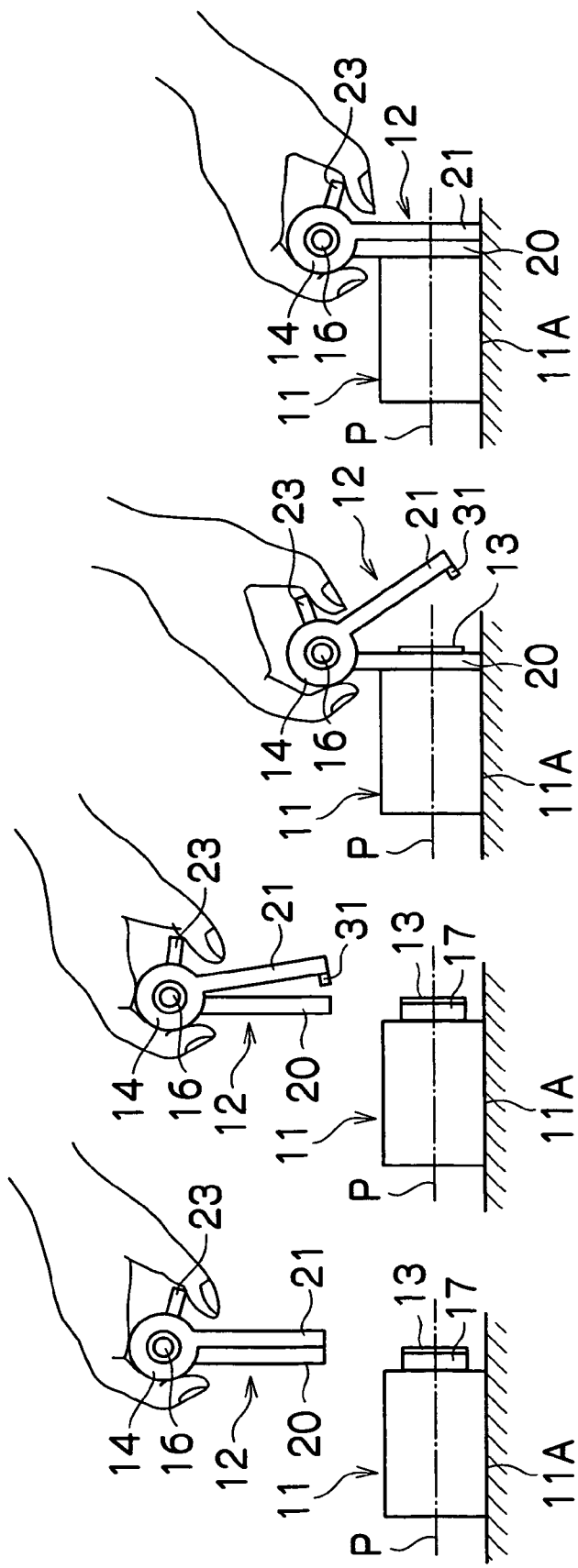

IMAGE PICKUP APPARATUS

BACKGROUND OF THE INVENTION

1. Field of the Invention

The present invention relates to an image pickup apparatus, and more particularly to an image pickup apparatus such as an interchangeable-lens camera in which a lens unit is removable from a camera body.

2. Description of the Related Art

Conventionally, interchangeable-lens cameras which allow a lens unit to be removed from a camera body for replacement is known in the field of film cameras. Recently, cameras which allow lens units to be changed have been proposed in the field of digital cameras as in the case of film cameras.

Generally, in such interchangeable-lens cameras, a lens unit is attached to the camera body using a bayonet mount. That is, the lens unit is mounted on the camera body by turning the lens unit on an optical axis with respect to the camera body.

Incidentally, some digital cameras have an image pickup element such as a CCD incorporated in the lens unit (see, for example, Japanese Patent Application Laid-Open No. 2004-350047). In such digital cameras, however, if the lens unit is attached to the camera body using a bayonet mount, it is not possible to provide a sufficient number of electrical contacts.

To deal with this problem, Japanese Patent Application Laid-Open No. 2003-156790 proposes an interchangeable-lens camera in which engaging members and fastening members of the lens unit and camera body are installed on opposite sides of the optical axis. In this camera, the lens unit is engaged with the camera body via the engaging members, tilted toward the camera body, and then fastened to the camera body via the fastening members. This makes it possible to mount the lens unit on the camera body without rotating it on the optical axis.

However, with the camera described in Japanese Patent Application Laid-Open No. 2003-156790, when mounting the lens unit on the camera body, an operator must hold the lens unit and camera body in different hands, having both hands full and interrupting other operations.

SUMMARY OF THE INVENTION

The present invention has been made in view of the above circumstances and has an object to provide an image pickup apparatus which allows a lens unit to be attached and detached to/from a camera body with one hand.

To achieve the above object, according to a first aspect of the present invention, there is provided an image pickup apparatus, comprising:

a lens unit, a grip unit which can be attached and detached to/from the lens unit and forms all or a part of a grip when photographing, a guiding member which, being set on the lens unit, guides the grip unit in a direction approximately orthogonal to an optical axis of the lens unit; and a guided member which is set on the grip unit and engaged with the guiding member.

According to the first aspect, the grip unit can be attached and detached to/from the lens unit by holding the grip unit with one hand. Specifically, with the grip unit held in one hand, the guided member on the grip unit can be engaged with and guided by the guiding member on the lens unit and then the grip unit can be attached to the lens unit. Also, with the grip unit held in one hand, the grip unit can be detached from the lens unit by disengaging the guided member from the guiding member on the lens unit. In the first aspect, it is preferable that the grip unit can be attached and detached laterally to/from the lens unit.

According to a second aspect of the present invention, the image pickup apparatus according to the first aspect further comprises a lock which, being disposed on the grip unit, restrains relative movement of the lens unit and the grip unit in the direction approximately orthogonal to the optical axis when the lens unit is mounted on the grip unit.

According to the second aspect of the present invention, since the lock is provided, it is possible to restrain relative movement of the lens unit and the grip unit in the direction approximately orthogonal to the optical axis. Since movements in directions other than the direction approximately orthogonal to the optical axis are restrained by the guided member and guiding member, the lock, when activated, can fasten the lens unit and the grip unit securely.

Also, according to the second aspect of the present invention, since the lock is installed on the grip unit, the lock can be operated with the hand which is gripping the grip unit.

According to a third aspect of the present invention, in the image pickup apparatus according to the second aspect, the lens unit is equipped with an image pickup element. The lens unit, which has the image pickup element as well as lenses, does not need a high positioning accuracy with respect to the grip unit. This makes it possible to simplify an attach/detach mechanism.

According to a fourth aspect of the present invention, in the image pickup apparatus according to the second or third aspect, the lock is disposed pivotally on the grip unit. This makes it possible to operate the lock using a simpler configuration.

According to a fifth aspect of the present invention, in the image pickup apparatus according to the second, third, or fourth aspect, the grip unit has a front member and rear member coupled pivotally, the guided member is set on the front member, the lock is disposed on the rear member, and the rear member is urged in a turning direction in which the lock operates.

According to the fifth aspect of the present invention, the grip unit is attached to the lens unit when the rear member is turned with the guided member on the front member engaged with the guiding member on the lens unit. Also, according to the fifth aspect, since the rear member is urged in the locking direction, the lock can be operated more easily.

According to a sixth aspect of the present invention, in the image pickup apparatus according to the fifth aspect, a display screen which displays images obtained through the lens unit is installed on the rear member.

The sixth aspect of the present invention, according to which the display screen is installed on the rear member, makes it possible to simplify the configuration and reduce the size of the apparatus compared to when the display screen is installed on the front member. Also, it makes it possible to adjust the attitude of the display screen by turning the rear member.

According to a seventh aspect of the present invention, in the image pickup apparatus according to any of the first to sixth aspects, the lens unit and the grip unit are equipped with electrical contacts which are connected when the lens unit and the grip unit are coupled. According to the seventh aspect, the electrical contacts are connected automatically when the lens unit and the grip unit are coupled.

According to an eighth aspect of the present invention, in the image pickup apparatus according to the second, third, fourth, fifth, sixth, or seventh aspect, the lock restrains the movement near the guided member. The eighth aspect, according to which the movement is restrained near the guided member, provides a reliable mechanical configuration.

According to a ninth aspect of the present invention, in the image pickup apparatus according to the second, third, fourth, fifth, sixth, seventh, or eighth aspect, the lock comprises a first lock and second lock, the first lock holding the lens unit to the grip unit and the second lock restraining the relative movement of the lens unit and the grip unit in the direction approximately orthogonal to the optical axis.

According to the ninth aspect of the present invention, since the lens unit is held to the grip unit by the first lock, locking operation can be performed easily by the second lock. Also, the use of two locks makes it possible to fasten the lens unit and the grip unit more securely.

The present invention, which allows the grip unit to be attached and detached to/from the lens unit by holding the grip unit with one hand, makes it possible to change lens units with one hand.

BRIEF DESCRIPTION OF THE DRAWINGS

FIGS. 6A to 6D are explanatory diagrams illustrating operation of the digital camera according to the first embodiment

DETAILED DESCRIPTION OF THE PREFERRED EMBODIMENTS

Preferred embodiments of the present invention will be described below with reference to the drawings. Incidentally, although in examples described below, the image pickup apparatus according to the present invention is applied to interchangeable-lens digital cameras, the present invention is not limited to this and can be applied to camera-equipped cell phones, film cameras, and the like.

Figure 1:
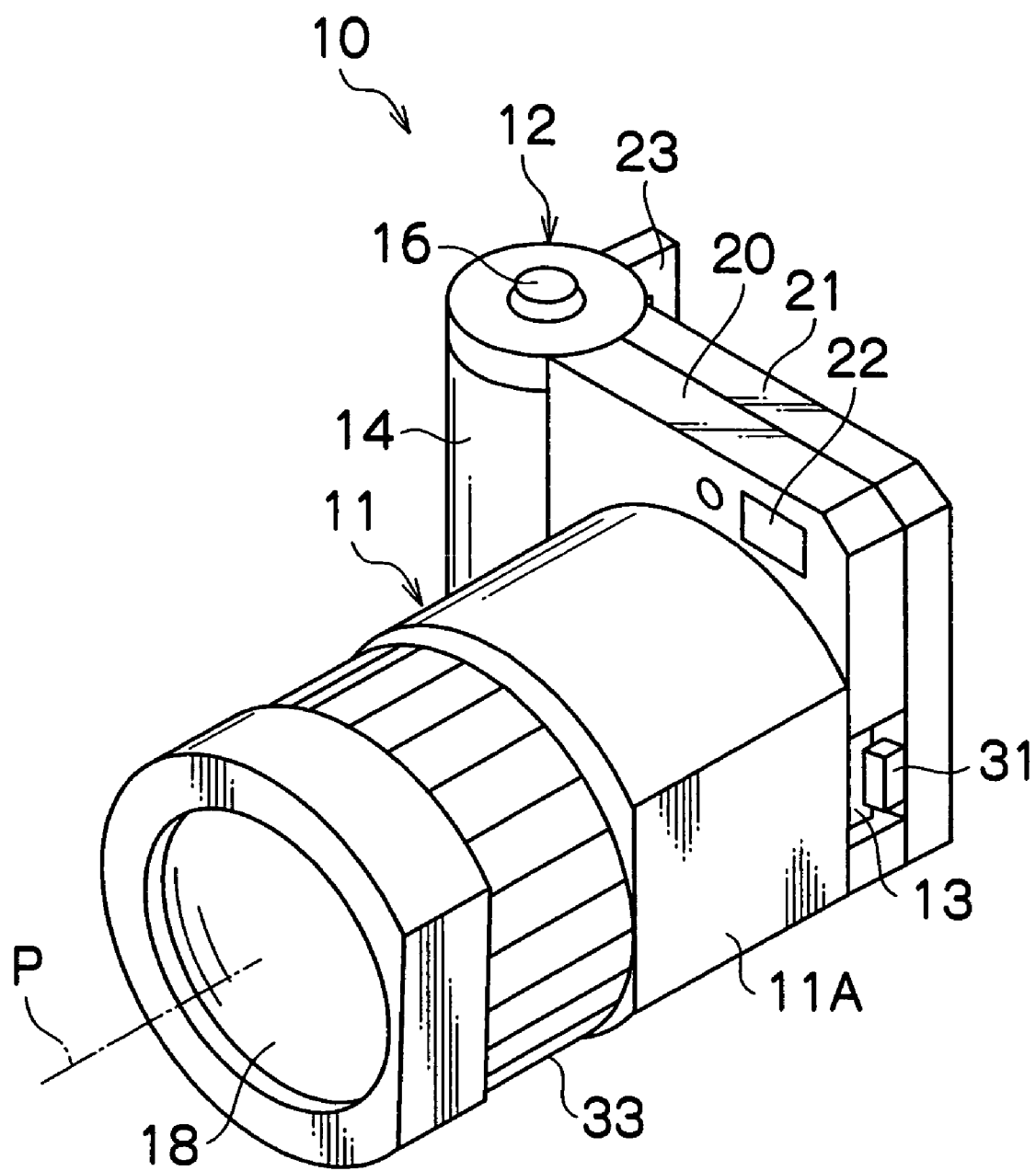
FIG. 1 is a perspective view of a digital camera according to a first embodiment as viewed from the front.
Figure 2:
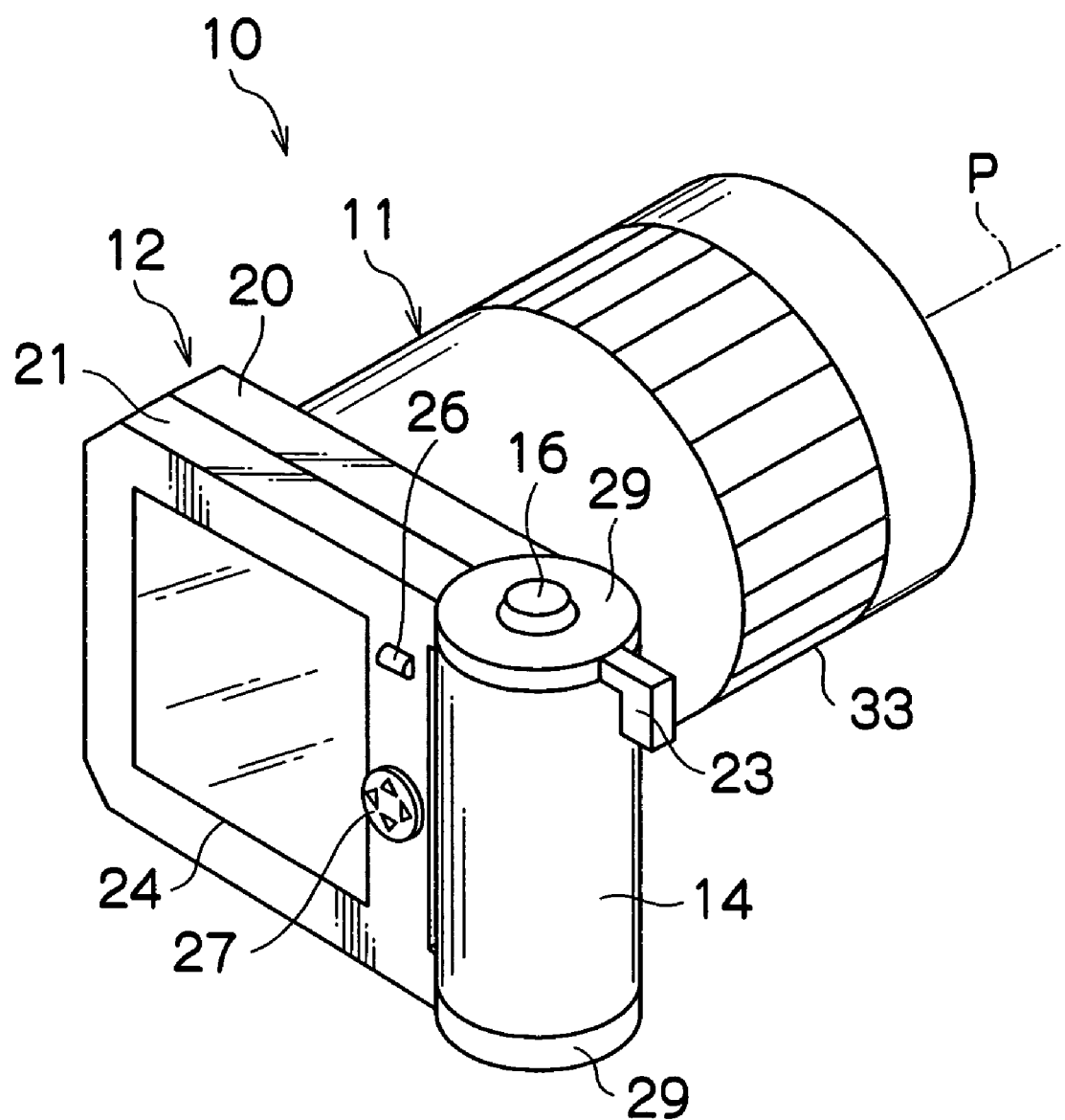
FIG. 2 is a perspective view of the digital camera according to the first embodiment as viewed from the rear.
Figure 3:
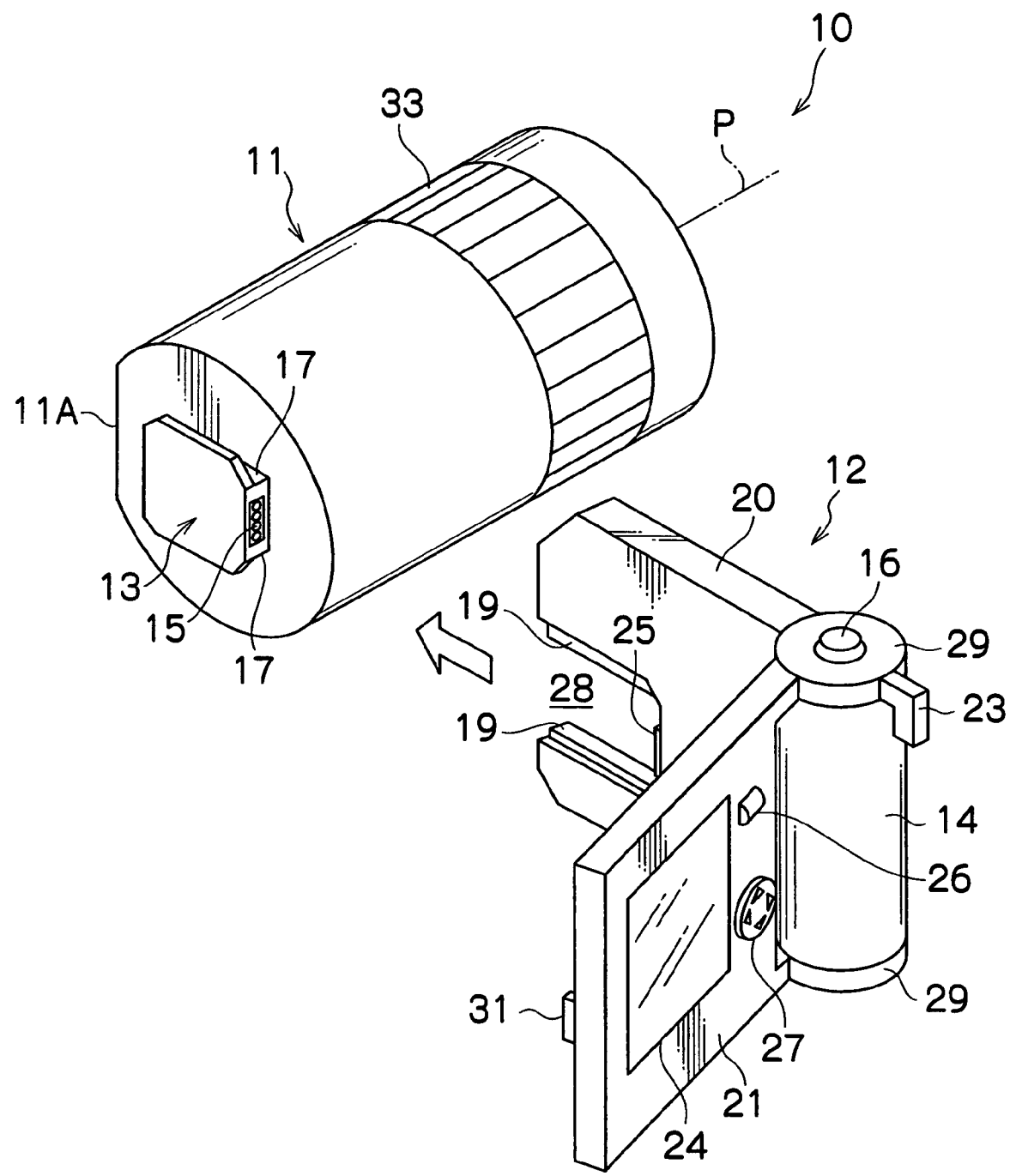
FIG. 3 is an assembly diagram of the digital camera according to the first embodiment.
Figure 4:
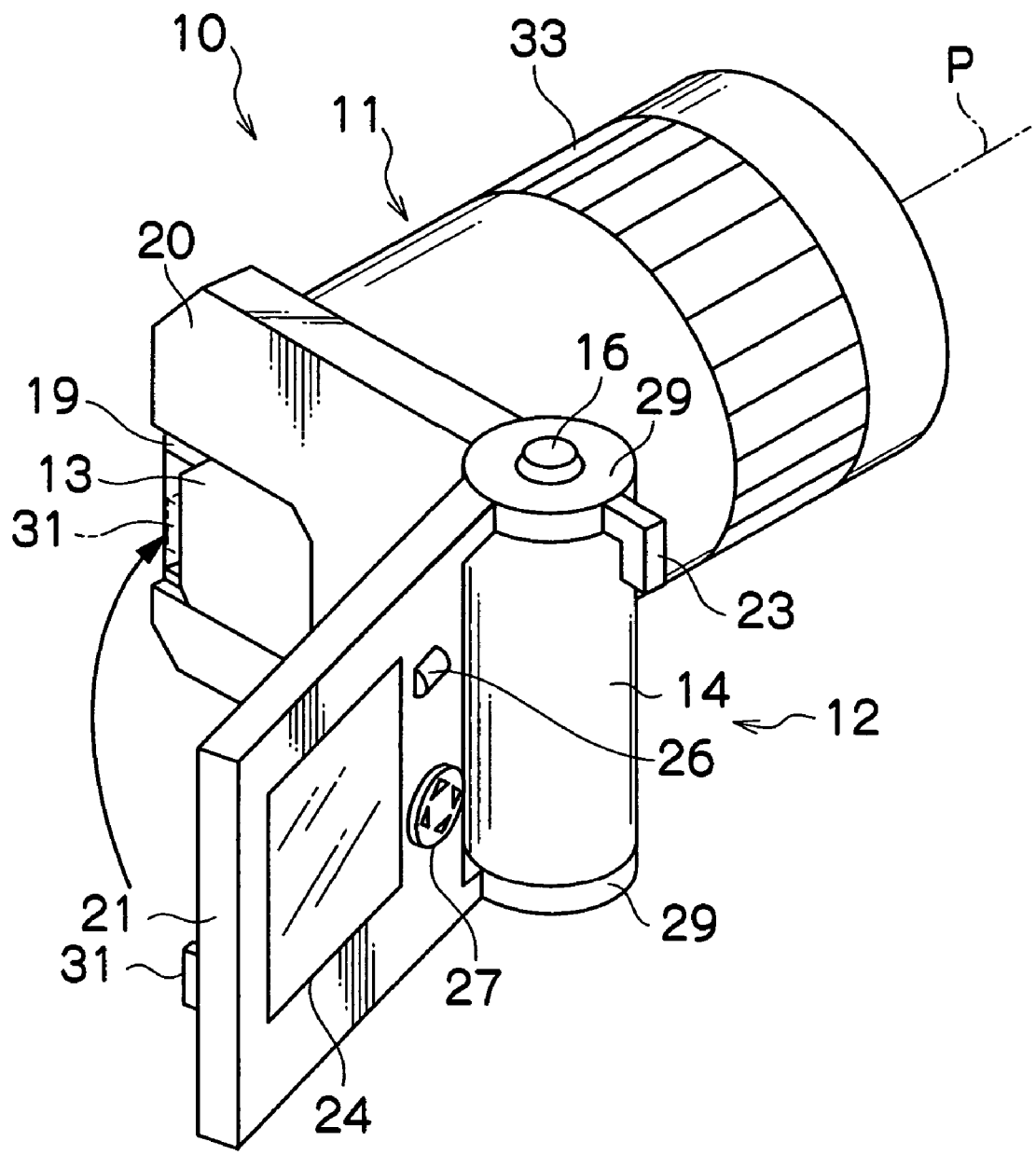
FIG. 4 is an assembly diagram of the digital camera according to the first embodiment.

FIG. 1 is a perspective view of a digital camera 10 according to a first embodiment as viewed from the front while FIG. 2 is a perspective view of the digital camera 10 as viewed from the rear. FIGS. 3 and 4 are assembly diagrams of the digital camera 10.

As shown in the figures, the digital camera 10 comprises a lens unit 11 and a camera body 12, where the camera body 12 is removably attached to the rear end of the lens unit 11.

The lens unit 11 is approximately cylindrical in shape with a flat surface 11A cut on its flank to form a D shape as shown in FIG. 1. The flat surface 11A is formed on the side opposite the mounting side of the camera body 12 (indicated by an arrow in FIG. 3). By placing the lens unit 11 with the flat surface 11A down, it is possible to prevent the lens unit 11 from rolling.

A taking lens 18 is installed at the front end of the lens unit 11. Also, control rings 33 such as a focus ring and zoom ring are turnably supported around the periphery of the lens unit 11. Incidentally, it is preferable that the control rings 33 do not protrude beyond the flat surface 11A, but this is not absolutely necessary.

As shown in FIG. 3, a CCD housing 13 protrudes from the rear face of the lens unit 11. A CCD 54 (see FIG. 5) and substrate (not shown) are housed in the CCD housing 13 and a female connector 15 which serves as an electrical contact is installed on a flank of the CCD housing 13. The female connector 15 is coupled with a male connector 25 (described later) on the camera body 12 to transmit photographic image and other data.

Groove-like guiding members 17 are formed on top and bottom faces of the CCD housing 13. The groove-like guiding members 17 are designed to engage with guided members 19 on the camera body 12 (described later). The guiding members 17 are formed in a direction orthogonal to an optical axis P of the lens unit 11.

On the other hand, the camera body 12 has a grip 14 which bulges out cylindrically and a shutter button 16 is provided on the top face of the grip 14. A flash unit 22 is installed in an upper right front part of the camera body 12 as shown in FIG. 1. A liquid crystal monitor 24, mode selector switch 26, and cross-key pad 27 are disposed in predetermined positions on the rear face of the camera body 12 as shown in FIG. 2.

The camera body 12 has a plate-like front part 20 extending from the grip 14 and a plate-like rear part 21 coupled with the front part 20 pivotally on the grip 14. The rear part 21 is pivotally coupled with the grip 14 via pivot hinges 29 with which a lever 23 is formed integrally. By turning the rear part 21 away from the front part 20, it is possible to open the rear part 21 away from the front part 20 with the lever 23 as shown in FIGS. 3 and 4. By turning the rear part 21 in the opposite direction, it is possible to close the rear part 21 over the front part 20 (i.e., fold the rear part 21 over the front part 20) as shown in FIGS. 1 and 2.

The grip 14 contains an urging device (not shown), which urges the rear part 21 in such a direction as to close over the front part 20. Thus, the rear part 21 is closed over the front part 20 if nothing is done. When the rear part 21 is turned by operating the lever 23 against an urging force of the urging device, the rear part 21 is opened away from the front part 20.

The base end of the front part 20 is coupled with the grip 14 as shown in FIG. 3. The front part 20 has an approximate U shape with a recess 28 formed on the front side of the front part 20 to accept the CCD housing 13 on the lens unit 11. The recess 28 is formed in such a way as to conform to the shape of the CCD housing 13 on the lens unit 11, and the guided members 19 convex in shape are formed on internal surfaces of the recess 28. The guided members 19 are formed in such a way as to engage with the guiding members 17 on the lens unit 11, and the CCD housing 13 is inserted in the recess 28 and guided to a predetermined mounting location as the guided members 19 are engaged with the guiding members 17. The connector 25 is disposed in the bottom of the recess 28 so as to be coupled with the connector 15 when the CCD housing 13 on the lens unit 11 is fully inserted in the recess 28.

The rear part 21 has a lock 31 at its tip. The lock 31 protrudes toward the front part 20. The lock 31 is placed to the left of the CCD housing 13 on the lens unit 11 as indicated by a two-dot chain line in FIG. 4 when the rear part 21 is closed over the front part 20. This prevents the front part 20 from moving relative to the lens unit 11 in the direction orthogonal to the optical axis, and thereby restrains the CCD housing 13 from coming off the recess 28.

Incidentally, it is advisable that a gap be formed around the CCD housing 13 when the camera body 12 is attached to the lens unit 11. For example, the lock 31 should be a little thicker than the CCD housing 13. Then, a little gap will be formed between the rear part 21 and front part 20 when the rear part 21 is closed over the front part 20. This will improve heat dissipation characteristics of the CCD housing 13, making it possible to prevent the CCD housing 13 from becoming hot.

Figure 5:
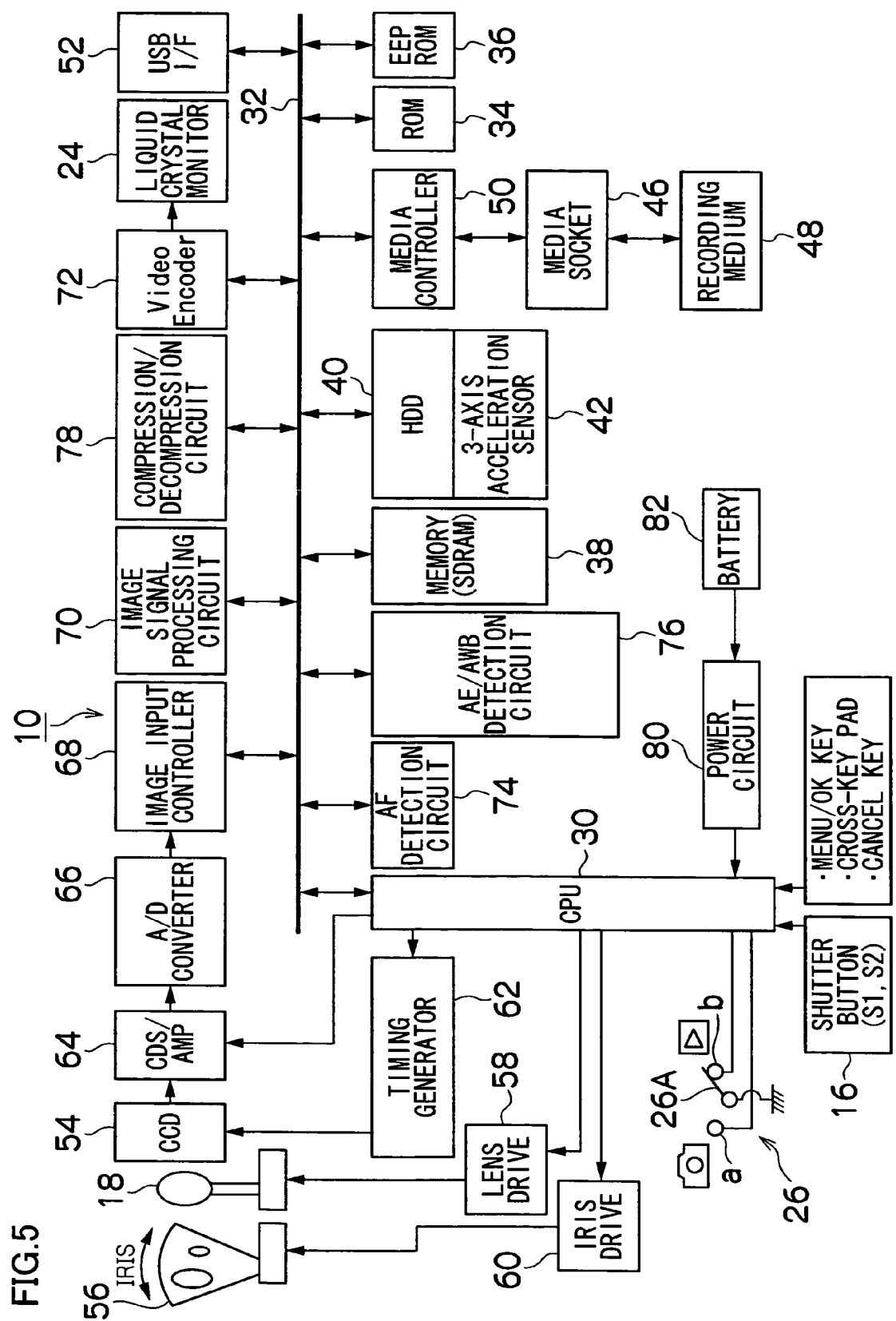
FIG. 5 is a block diagram showing an overall configuration of the digital camera according to the first embodiment.

FIG. 5 is a block diagram showing an internal configuration of the digital camera 10. It shows a configuration in which the camera body 12 is attached to the lens unit 11. Of the components shown in FIG. 5, at least the taking lens 18, the CCD 54, an iris/mechanical shutter 56, a lens drive 58, and an iris drive 60 are installed in the lens unit 11. They are electrically connected to components installed in the camera body 12 via the connectors 15 and 25 (see FIG. 3).

As shown in FIG. 5, the digital camera 10 has its entire operation totally controlled by a central processing unit (CPU) 30. The CPU 30 functions as a control device which controls the camera system based on a predetermined program and as a computation device which performs various computations including automatic exposure (AE) computations, autofocus (AF) computations, and white balance (WB) computations.

A ROM 34 connected to the CPU 30 via a bus 32 contains programs executed by the CPU 30 as well as various data and the like needed for control. An EEPROM 36 contains CCD pixel defect information, various constants/information related to camera operation, etc.

A memory (SDRAM) 38 is used as a program load area, a work area for the CPU 30, and a temporary storage area for image data or voice data. An HDD (hard disk drive unit) 40, which is erasable, is a temporary storage memory used exclusively to store image data. It incorporates a three-axis acceleration sensor 42 for use to detect free fall and vibration (dynamic acceleration). When free fall of the digital camera 10 is detected by the three-axis acceleration sensor 42, a head is retracted from a hard disk of the HDD 40 by a head retraction device (not shown) incorporated in the HDD 40.

The three-axis acceleration sensor 42 detects vibrations of the camera body 12 in three axis directions (X, Y, and Z axes orthogonal to each other) when the shutter button 16 is pressed (released) and outputs a voltage signal which represents the vibration detected in each axis direction to the CPU 30. The CPU 30 calculates a variation (which corresponds to velocity of deflection) in the voltage signal outputted for each axis, compares the calculated variations with prestored variations which represent allowable vibrations, displays a warning on the liquid crystal monitor if the calculated variations exceed the variations which represent allowable vibrations, and then prompts the user to take a photograph again by informing the user about a mode change.

The mode selector switch 26 is a control device used to switch between Shoot mode and Playback mode. When a movable contact strip 26A is connected to a contact a by manipulation of the mode selector switch 26, a signal about that is inputted in the CPU 30, the digital camera 10 is set to the Shoot mode. When the movable contact strip 26A is connected to a contact b, the digital camera 10 is set to the Playback mode to play back recorded images.

The shutter button 16 is an operation button used to give a command to start shooting. It has a two-stage configuration consisting of a switch S1 which is turned on when the shutter button 16 is half-pressed and a switch S2 which is turned on when the shutter button 16 is full-pressed.

A Menu/OK key (not shown in FIG. 2) is an operation key which combines functions of a menu button used to display a menu on a screen of the liquid crystal monitor 24 and an OK button used to confirm and apply a selection. The cross-key pad 27 (see FIG. 2) is a control used to give four types of direction command (Up, Down, Left, and Right). It functions as a button used to select an item on the menu screen or select various settings from individual menus. A Cancel key (not shown in FIG. 2) is used to erase a desired object such as a selected item, cancel a command, or return to the previous state.

The liquid crystal monitor 24, which is also used as a user interface screen, displays menu information, selected items, settings, or other information as required. The liquid crystal monitor 24 is a liquid crystal display, but an organic EL or other display units may be used alternatively.

The digital camera 10 has a media socket 46 into which a recording medium 48 may be inserted. There is no restriction on the type of recording medium and various media may be used including semiconductor memory cards typified by Smart Media (trademark), small portable hard disks, magnetic disks, optical disks, and magneto-optical disks.

A media controller 50 performs necessary signal conversion to exchange input and output signals compatible with the recording medium 48 inserted in the media socket 46.

Also, the digital camera 10 is equipped with a USB interface 52 as a communications device for connection with external devices such as personal computers. By connecting the digital camera 10 with external devices via a USB cable, it is possible to exchange data with the external devices. Of course, communications systems other than USB are also available.

Next, photo-taking functions of the digital camera 10 will be described.

When the Shoot mode is selected by the mode selector switch 26, power is supplied to an image pickup portion which includes a color CCD solid-state image pickup element (hereinafter abbreviated to CCD) 54, making the digital camera 10 ready to shoot.

The lens unit 11 is an optical unit consisting of the taking lens 18 which includes a focus lens and the iris/mechanical shutter 56. The lens unit 11 is motor-driven by the lens drive 58 and iris drive 60 which in turn are controlled by the CPU 30. It performs zoom control, focus control, and iris control.

Light passing through the taking lens 18 forms an image on a light-sensitive surface. A large number of photodiodes (light-sensitive elements) are arranged two-dimensionally on the light-sensitive surface of the CCD 54. Primary color filters of red (R), green (G), and blue (B) are arranged in a certain structure for each photodiode. The CCD 54 has an electronic shutter function for controlling a charging time (shutter speed) of each photodiode. The charging time on the CCD 54 is controlled by the CPU 30 via a timing generator 62. Incidentally, an image pickup element of another type such as an MOS may be used instead of the CCD 54.

A subject image formed on the light-sensitive surface of the CCD 54 is converted by the photodiodes into signal charges corresponding to the amount of incident light. The signal charges accumulated in the photodiodes are read out in sequence as a voltage signal (image signal) based on drive pulses supplied from the timing generator 62 on instructions from the CPU 30.

The signal outputted from the CCD 54 is sent to an analog processor (CDS/AMP) 64, in which R, G, B signals of each pixel are sampled and held (correlated double sampling), amplified, and then sent to an A/D converter 66. Dot-sequential R, G, B signals converted into digital signals by the A/D converter 66 are stored in the memory 38 via an image input controller 68.

An image signal processing circuit 70 processes the R, G, B signals stored in the memory 38 on instructions from the CPU 30. Specifically, the image signal processing circuit 70 functions as an image processing device including a simultaneous excitation circuit (a processing circuit which interpolates spatial displacement of color signals resulting from color filter arrangement of a single-panel CCD, and thereby converts the color signals into simultaneous color signals), white balance correction circuit, gamma correction circuit, profile correction circuit, and luminance and color difference signal generation circuit, and thereby performs predetermined signal processing using the memory 38 on command from the CPU 30.

R, G, B image data inputted in the image signal processing circuit 70 are converted into a luminance signal and color difference signal and subjected to predetermined processing such as gamma correction by the image signal processing circuit 70. After being processed by the image signal processing circuit 70, the image data are stored in the HDD 40.

When displaying photographic images on the liquid crystal monitor 24, image data are read out of the HDD 40 and sent to a video encoder 72 via the bus 32. The video encoder 72 converts the inputted image data into a signal in a predetermined display format (e.g., a composite color video signal in the NTSC format) and outputs the signal to the liquid crystal monitor 24.

When the shutter button 16 is half-pressed, turning on S1, the digital camera 10 starts AE and AF processes. That is, the image signal outputted from the CCD 54 is inputted in an AF detection circuit 74 and AE/AWB detection circuit 76 via the image input controller 68.

The AE/AWB detection circuit 76 includes a circuit which divides a screen into multiple areas (e.g., 16×16) and integrates R, G, B signals from the resulting areas. The AE/AWB detection circuit 76 supplies the integrated values to the CPU 30. The CPU 30 detects brightness of a subject (subject luminance) based on the integrated values from the AE/AWB detection circuit 76 and calculates an exposure value (photographic EV value) suitable for photography. An f-stop number and shutter speed are determined based on the calculated exposure value and a predetermined program chart. Then, the CPU 30 obtains a proper amount of exposure by controlling the electronic shutter and iris of the CCD 54 based on the f-stop number and shutter speed.

During automatic white balance adjustment, the AE/AWB detection circuit 76 calculates an average integrated value of each color in the R, G, B signals for each of the divided areas and provides the calculation results to the CPU 30. Upon receiving the respective integrated values of R, B, and G, the CPU 30 finds ratios of R/G and B/G for each of the divided areas, determines the type of light source based on distribution of the R/G and B/G values in R/G and B/G color spaces, and corrects signals on each color channel by controlling gain values (white balance correction values) for R, G, B signals of a white balance adjustment circuit such that, for example, the values of the R/G and B/G ratios will be approximately 1 according to a white balance adjustment value suitable for the determined type of light source. If the gain values of the white balance adjustment circuit are adjusted such that the values of the R/G and B/G ratios will be other than 1, it is possible to generate an image with a certain tinge.

AF control in the digital camera 10 employs, for example, contrast AF which involves moving a focusing lens (movable lenses, in a lens optical system of the taking lens 18, which contribute to focus adjustment) in such a way as to maximize a high-frequency component of a G signal of video signals. That is, the AF detection circuit 74 consists of a high-pass filter which passes only the high-frequency component of the G signal, absolute-value calculator, AF area extractor which cuts signals in a predetermined focus area (e.g., central part of the screen) out of the screen, and integrator which integrates absolute value data in the AF area.

The data of the integrated values obtained by the AF detection circuit 74 are passed to the CPU 30. The CPU 30 calculates focus evaluation values (AF evaluation values) at a plurality of AF detection points while moving the focusing lens by controlling the lens drive 58 and determines a lens position which maximizes the evaluated focus value to be an in-focus position. Then, it makes the lens drive 58 move the focusing lens to the determined in-focus position. Incidentally, the focus evaluation values may be calculated using the luminance signal (Y signal) instead of the G signal.

After the AE/AF processes which is started when SI is turned on at a half-press of the shutter button 16, when the shutter button 16 is full pressed, turning on S2, a shooting operation for recording is started. Image data acquired in response to the activation of S2 is converted into a luminance/color difference signal (Y/C signal) and subjected to predetermined processing including gamma correction by the image signal processing circuit 70, and then they are stored in the memory 38.

The Y/C signal stored in the memory 38 is compressed in a predetermined format by a compression/decompression circuit 78 and recorded on a recording medium 48 via a media controller 50. Still images, for example, are stored in JPEG format.

When the Playback mode is selected by the mode selector switch 26, compressed data are read from the last file (file last recorded) on the recording medium 48. If the last file recorded is a still-image file, the compressed image data read out is decompressed into an uncompressed YC signal by the compression/decompression circuit 78, converted into a signal for display by the image signal processing circuit 70 and video encoder 72, and outputted to the liquid crystal monitor 24. Consequently, the image from the file is displayed on the screen of the liquid crystal monitor 24.

During frame-by-frame playback of still images (including playback of the first frame of moving images), the file to be played back (forward/backward frame advance) can be changed using the Right key or Left key of the cross-key pad. The image file corresponding to the given frame is read out of the recording medium 48 and the still image or moving image is displayed on the screen of the liquid crystal monitor 24 in a manner similar to that described above. Incidentally, the digital camera 10 is driven by power supplied from a battery 82 via a power circuit 80.

Next, operation of the digital camera 10 configured as described above will be described with reference to FIGS. 6A to 6D, which are explanatory diagrams illustrating how the camera body 12 is attached to the lens unit 11 placed with the flat surface 11A down.

First, by gripping the camera body 12 with one hand as shown in FIG. 6A, the user opens the rear part 21 away from the front part 20 as shown in FIG. 6B by rotating the lever 23.

Next, the CCD housing 13 on the lens unit 11 is inserted in the recess 28 in the front part 20. In so doing, the guided members 19 (see FIG. 3) in the front part 20 is engaged with the guiding members 17. Consequently, the CCD housing 13 on the lens unit 11 can be inserted securely in the recess 28 in the front part 20.

As shown in FIG. 6C, when the CCD housing 13 on the lens unit 11 is fully inserted in the recess 28, the connector 15 on the lens unit 11 is coupled with the connector 25 on the camera body 12. In this state, if the user takes his/her hand off the lever 23 (or relaxes the pressure on the lever 23), the rear part 21 turns toward the front part 20 as shown in FIG. 6D by the urging force of the urging device (not shown) and is closed over the front part 20. Consequently, the lock 31 is placed under the lens unit 11 (the other side in the attaching direction). This prevents the CCD housing 13 on the lens unit 11 from moving relative to the camera body 12 in the direction orthogonal to the optical axis P. At the same time, movements other than in the direction orthogonal to the optical axis P are restrained by the guiding members 17 and guided members 19, and thus the lens unit 11 is fastened to the camera body 12.

In this way, the camera body 12 is attached to the lens unit 11. In so doing, the photographer only needs to operate the camera body 12 with one hand without the need to grip the lens unit 11. Thus, the digital camera 10 according to this embodiment allows the camera body 12 to be attached to the lens unit 11 with one hand.

The camera body 12 is removed from the lens unit 11 in an order opposite to how it is attached. Specifically, with the camera body 12 held with one hand as shown in FIG. 6D, the user opens the rear part 21 away from the front part 20 by turning the lever 23 as shown in FIG. 6C. This releases the lock 31.

The user picks up the camera body 12 in an open state as shown in FIG. 6B. Consequently, the CCD housing 13 on the lens unit 11 falls off the recess 28 in the camera body 12, disengaging the camera body 12 from the lens unit 11.

Then, as shown in FIG. 6A, the user closes the front part 20 and rear part 21 of the camera body 12. This completes the operation of removing the camera body 12 from the lens unit 11. Again, in the removal operation, the photographer only needs to hold the camera body 12 with one hand without the need to grip the lens unit 11. Thus, the digital camera 10 according to this embodiment allows the camera body 12 to be attached and detached to/from the lens unit 11 with one hand, thus allowing the lens unit 11 to be changed with one hand. Therefore, the photographer can change the lens unit 11 easily even if he/she has one of his/her hands occupied.

Figure 7A:
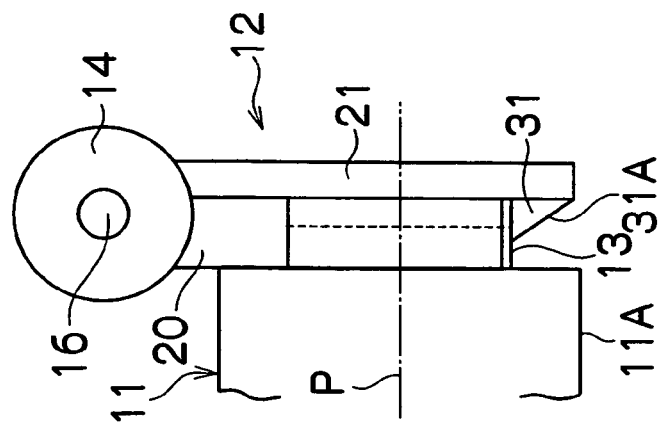
FIGS. 7A to 7C are explanatory diagrams illustrating a digital camera with a lock of a different shape.
Figure 7B:
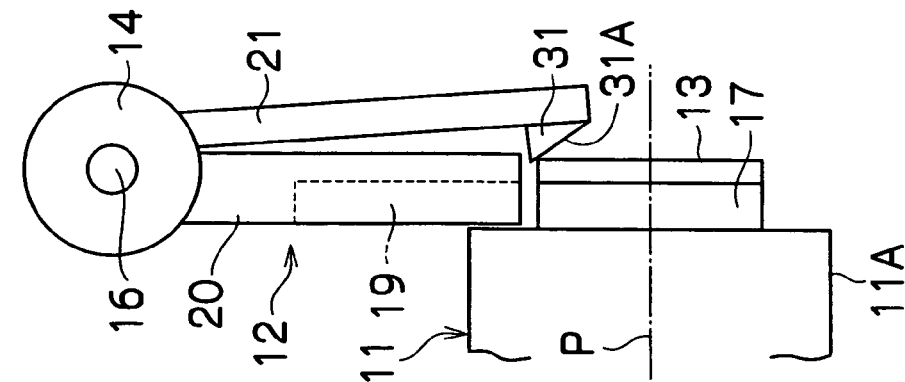
Figure 7C:
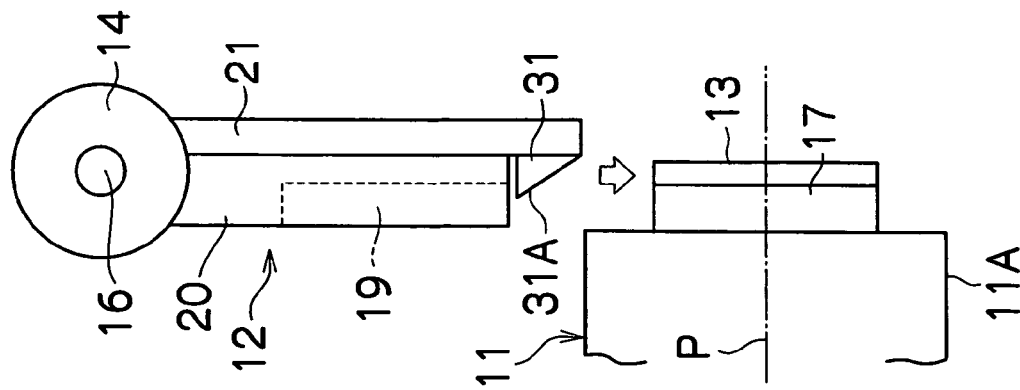

In the first embodiment described above, there is no particular limit to the shape of the lock 31, and any shape may be used as long as the lock 31 is engaged securely with the CCD housing 13 on the lens unit 11. Thus, for example, a taper 31A may be provided at the tip of the lock 31 as shown in FIG. 7A. In that case, if the CCD housing 13 is inserted in the recess 28 with the rear part 21 closed over the front part 20, the CCD housing 13 slides over the taper 31A of the lock 31 as shown in FIG. 7B, pushing the rear part 21 away from the front part 20. This makes it possible to insert the CCD housing 13 in the recess 28 in the front part 20. When the CCD housing 13 is fully inserted in the recess 28 in the front part 20, the rear part 21 is closed over the front part 20 by an urging force as shown in FIG. 7C, causing the lock 31 to restrain the movement of the CCD housing 13 and front part 20. In this way, the taper 31A provided at the tip of the lock 31 makes it easier to attach the camera body 12 to the lens unit 11. Incidentally, a taper may be provided on the CCD housing 13 on the side where the CCD housing 13 is inserted in the front part 20. This produces the same effect as the configuration described above. Also, the lock 31 may be semicircular in cross section.

Figure 8:
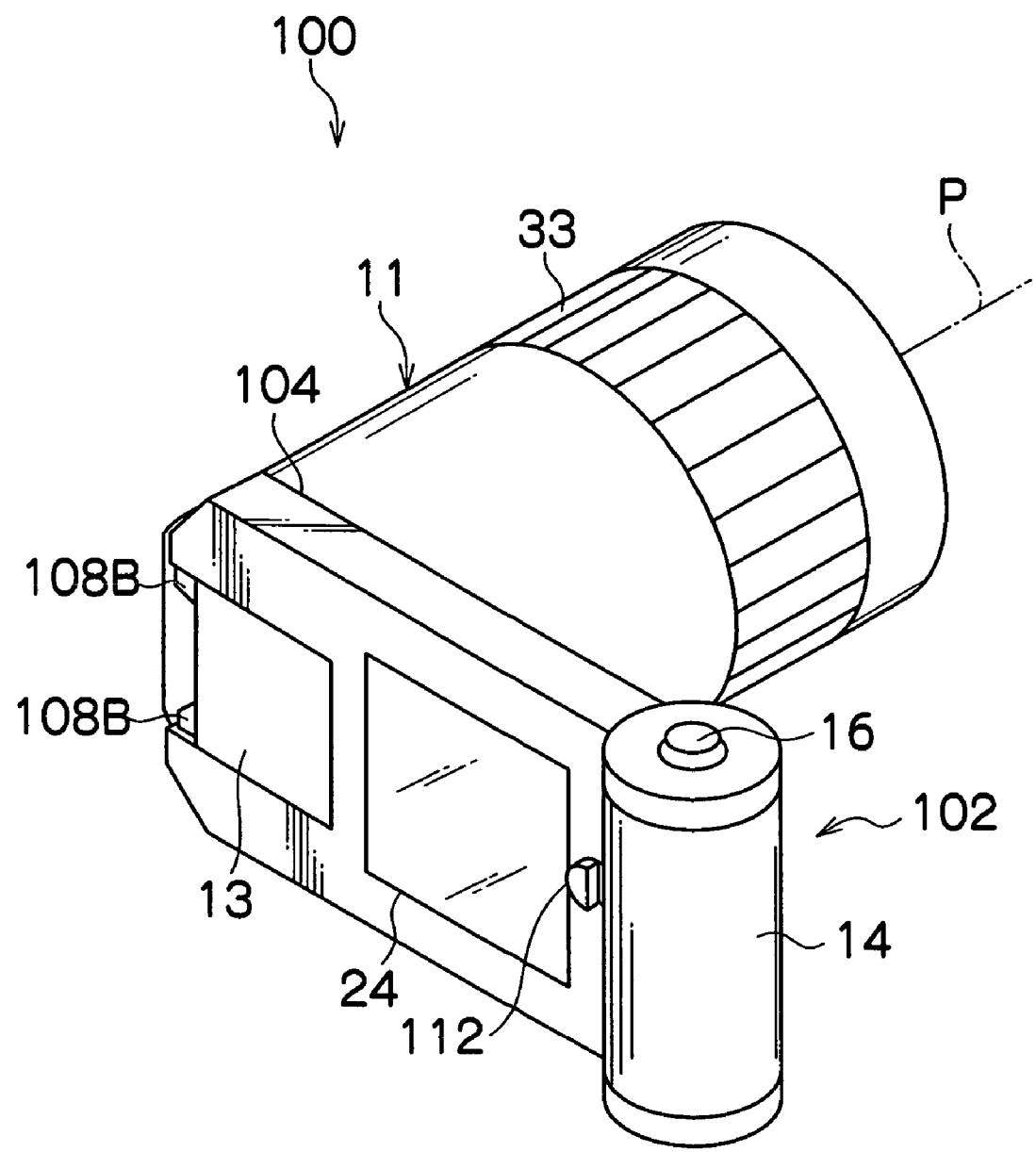
FIG. 8 is a perspective view showing the back side of a digital camera according to a second embodiment.
Figure 9:
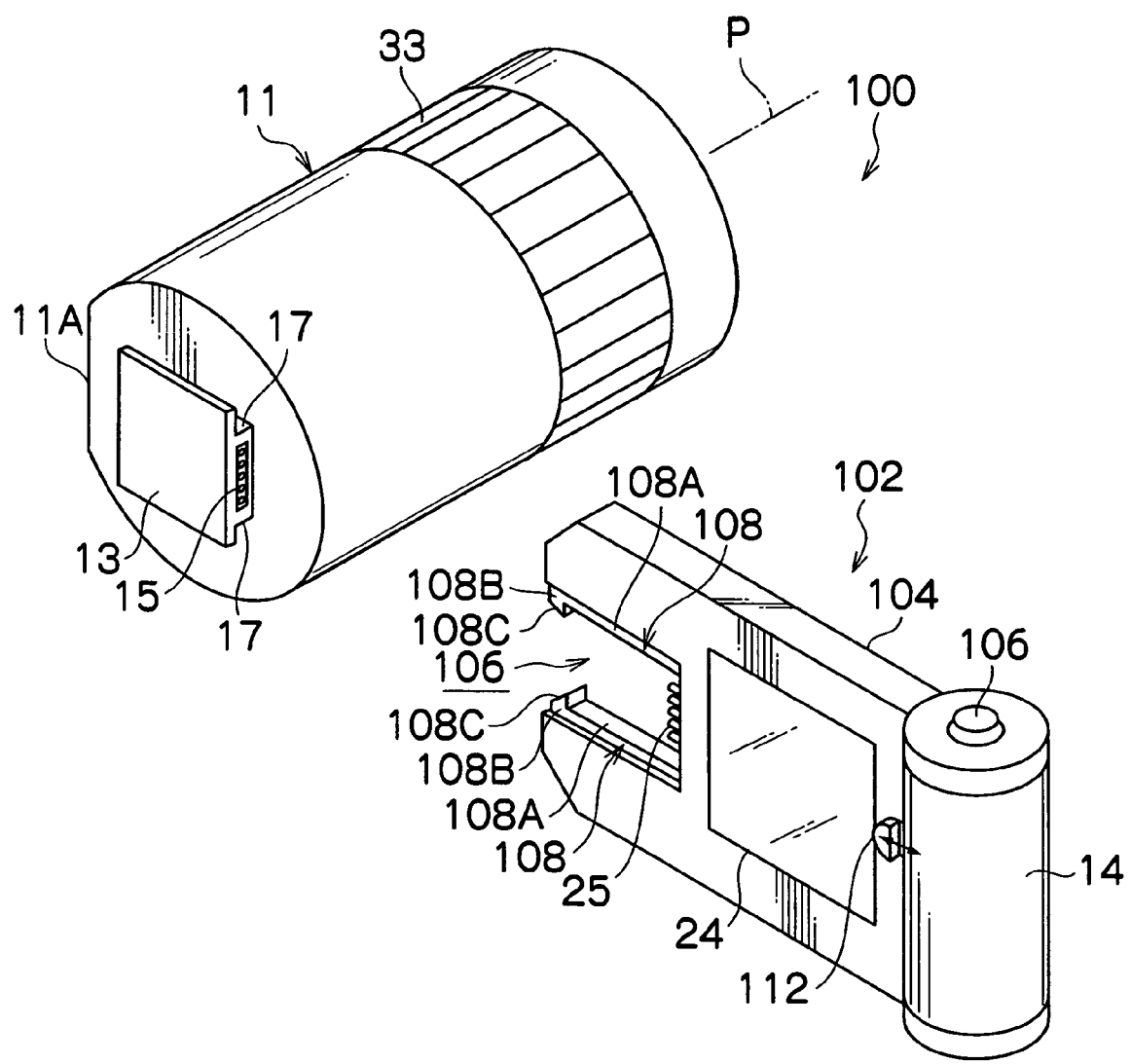
FIG. 9 is an assembly diagram of the digital camera according to the second embodiment.
Figure 10A:
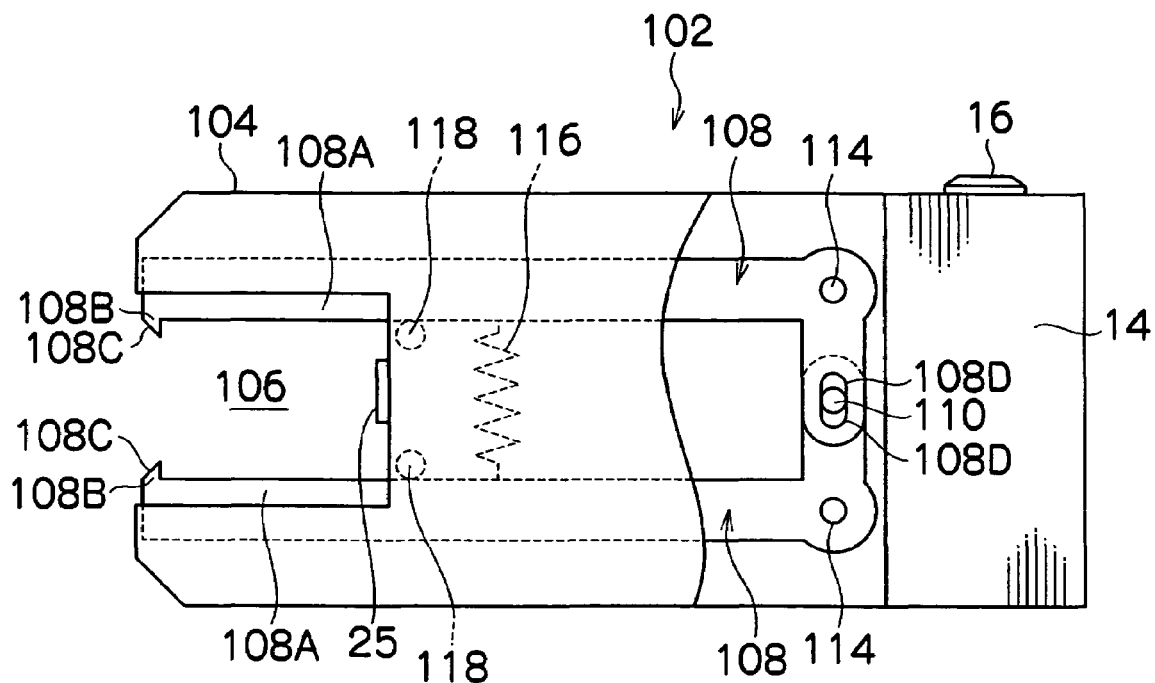
FIGS. 10A and 10B are diagrams showing an internal configuration of the digital camera according to the second embodiment.
Figure 10B:
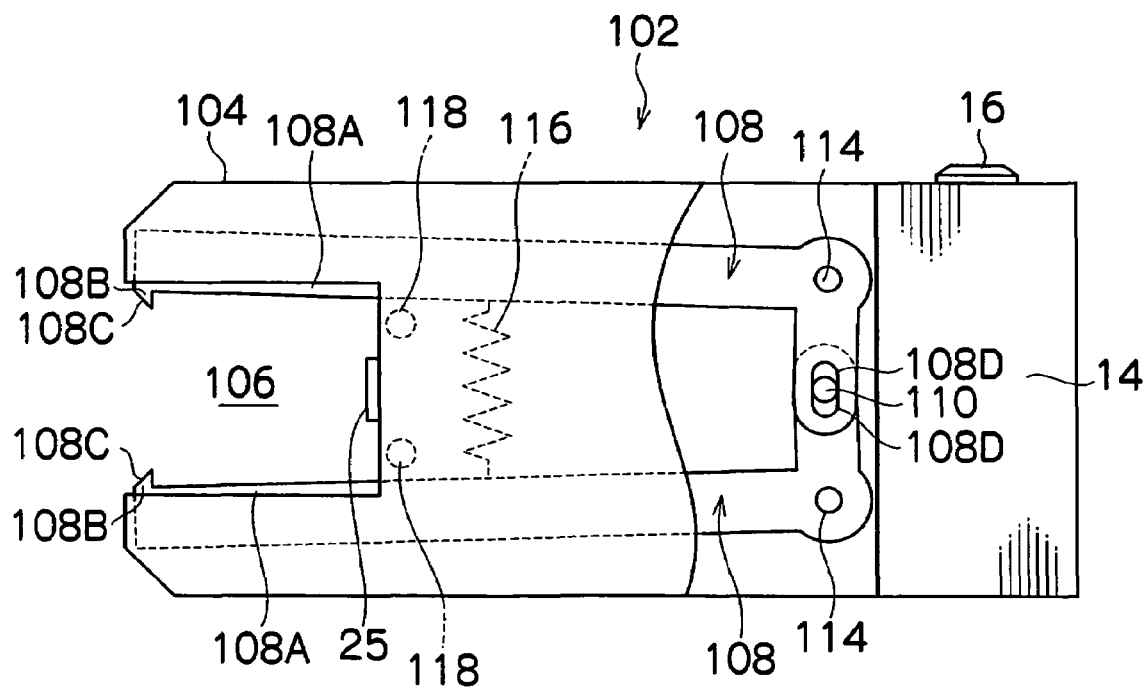

Next, a second embodiment will be described with reference to FIGS. 8 to 10. FIG. 8 is a perspective view showing the back side of a digital camera 100 according to the second embodiment. FIG. 9 is an assembly diagram of the digital camera 100. FIG. 10 is a diagram showing an internal structure of a camera body 102. Incidentally, components with the same configuration and operation as those of the first embodiment are designated by the same reference numerals as the corresponding components of the first embodiment, and description thereof will be omitted.

The camera body 102 of the digital camera 100 according to the second embodiment shown in FIGS. 8 to 10 differs from that of the digital camera 10 according to the first embodiment. Specifically, it has a casing 104 formed integrally with a grip 14, and a liquid crystal monitor 24 and various switches (not shown) are installed on the back of the casing 104.

As shown in FIG. 9, a recess 106 is formed at the tip of the casing 104 to accept a CCD housing 13 on a lens unit 11. A connector 25 is installed in the bottom of the recess 106. Levers 108 are installed on inner surfaces of the recess 106.

The levers 108 have guided members 108A convex in shape to engage with guiding members 17 on the lens unit 11. Also, they have locks 108B which are installed at the tips of the guided members 108A, protruding inward. When the CCD housing 13 is inserted in the recess 106, the locks 108B are engaged with the CCD housing 13, preventing the CCD housing 13 from coming off the recess 106. Also, tapers 108C are formed at the tips of the locks 108B so that when the CCD housing 13 is inserted in the recess 106, the CCD housing 13 will slide over the tapers 108C to expand the locks 108B outward.

As shown in FIG. 10, the levers 108 are approximately L-shaped. The levers 108 are supported at bends swingably around axes 114 by the casing 104. Incidentally, the levers 108 have been installed with the guided members 108A and locks 108B protruding in the recess 106 in the casing 104. Consequently, the amount of protrusion changes when the levers 108 swing.

At the other ends of the levers 108, slots 108D are formed in the direction orthogonal to the guided members 108A. An unlock pin 110 is passed through the slots 108D. It is linked to an unlock button 112 shown in FIG. 9. The unlock button 112 is installed swingably in the direction of an arrow in FIG. 9. When the unlock button 112 is moved left in FIG. 9, the levers 108 engaged with the unlock pin 110 swings, causing the locks 108B at the tips of the levers 108 to retract outward (in such a direction as to increase spacing). Consequently, the CCD housing 13 on the lens unit 11 is disengaged from the locks 108B, releasing the lock.

A spring 116 is installed in the casing 104 with its ends attached to the respective levers 108, urging the levers 108 inward (in such a direction as to decrease the spacing).

Also, stopper pins 118 are installed in the casing 104. They are disposed on the inner sides of the respective levers 108 to restrain inward swing of the levers 108 by engaging with the levers 108. Incidentally, the stopper pins 118 are placed in such a way as to restrain the levers 108 at locations where the guided members 108A on the levers 108 will be parallel to each other.

With the digital camera 100 according to the second embodiment configured as described above, to attach the camera body 102 to the lens unit 11, the user inserts the CCD housing 13 on the lens unit 11 in the recess 106 in the camera body 102 by gripping the camera body 102. In so doing, it is advisable to place the lens unit 11 on a flat surface as in the case of FIG. 6.

As the CCD housing 13 on the lens unit 11 is inserted in the recess 106 in the camera body 102, the CCD housing 13 expands the spacing between the levers 108 by sliding over the tapers 108C of the locks 108B. As the user further inserts the CCD housing 13 in the recess 106, the guided members 108A on the levers 108 engage with the guiding members 17 on the lens unit 11, guiding the CCD housing 13 reliably into the recess 106.

When the CCD housing 13 is fully inserted in the recess 106, the connector 15 on the lens unit 11 is coupled with the connector 25 on the camera body 12 and the levers 108 swing inward by the urging force of a spring 120, causing the locks 108B at their tips to be engaged with the CCD housing 13. This restrains the movement of the lens unit 11 in the direction of the optical axis P, thereby fastening the lens unit 11 to the camera body 102. Thus, the second embodiment makes it possible to attach the camera body 102 to the lens unit 11 by holding the camera body 102 with one hand. In particular, it allows the lens unit 11 to be mounted on the camera body 102 by simply inserting the CCD housing 13 on the lens unit 11 in the recess 106 in the camera body 102. This makes the mounting operation easier.

When detaching the lens unit 11 and camera body 102 from each other, the user grips the grip 14 of the camera body 102 and moves the unlock button 112 leftward in FIG. 8 with the gripping hand. Consequently, the pair of levers 108 swing against the urging force of the spring 120, expanding the spacing between the locks 108B and thereby disengaging the locks 108B from the CCD housing 13. In this state, the user can remove the camera body 102 from the lens unit 11 by moving the camera body 102 in such a direction as to pull the CCD housing 13 out of the recess 106. Thus, the second embodiment makes it possible to remove the camera body 102 from the lens unit 11 by griping the camera body 102 with one hand and operating the unlock button 112 with the gripping hand.

In this way, the second embodiment allows the camera body 102 to be attached and detached easily to/from the lens unit 11 with one hand.

Also, the second embodiment provides highly reliable locking because the locks 108B on the camera body 102 comes into operation by being engaged with the guiding members 17.

Figure 11:
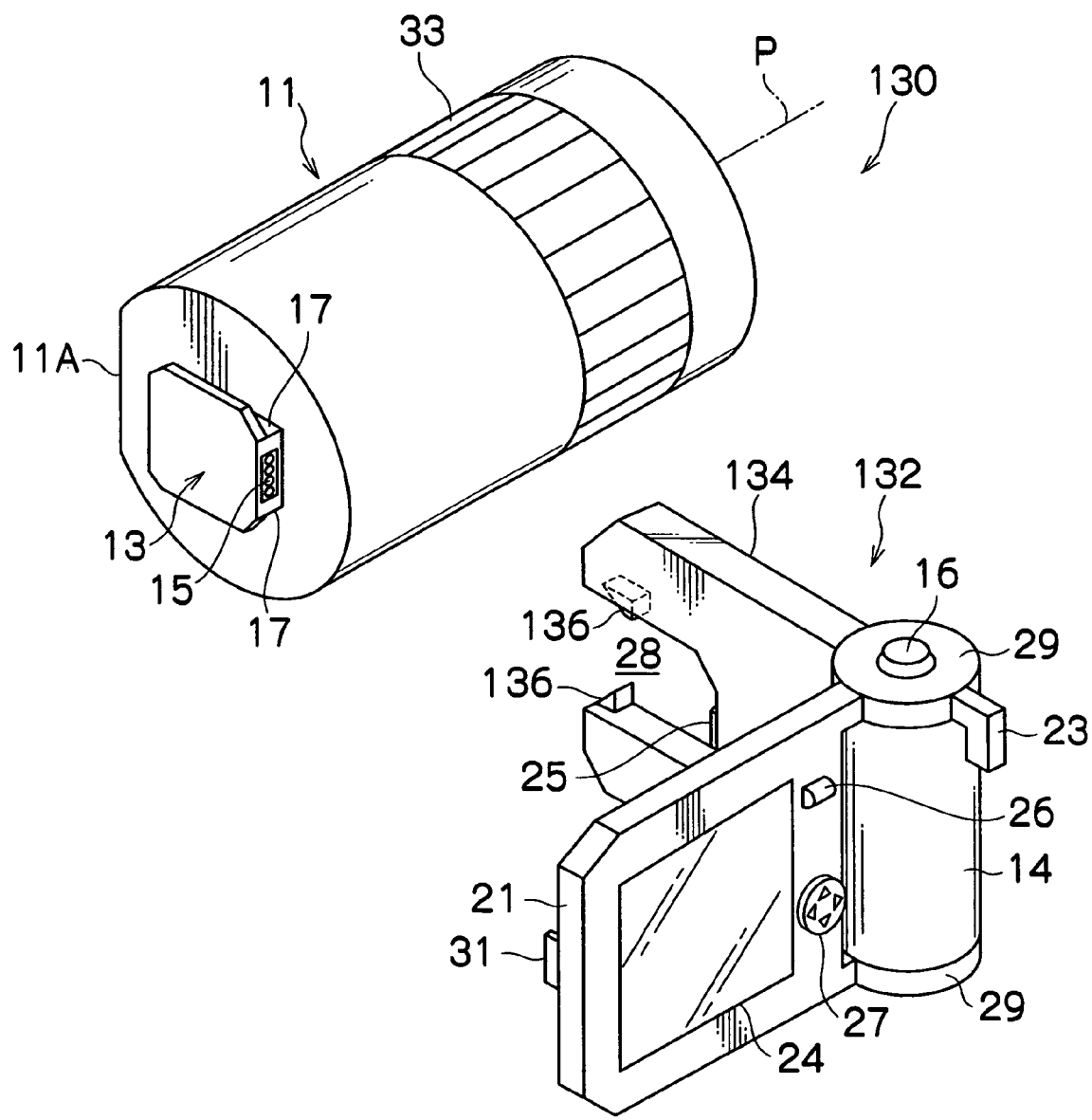
FIG. 11 is an assembly diagram of a digital camera according to a third embodiment.

Next, a third embodiment will be described with reference to FIG. 11. FIG. 11 is an assembly diagram of a digital camera according to the third embodiment.

The digital camera 130 according to the third embodiment shown in FIG. 11 differs from the digital camera 10 according to the first embodiment in configuration of a front part 134 of a camera body 132. Specifically, according to the third embodiment, a pair of protrusions (which corresponds to a first lock) 136 are provided in the front part 134 of the camera body 132. The pair of protrusions 136 are formed in the recess 28 protruding inward so as to engage with the CCD housing 13 when the CCD housing 13 is inserted in the recess 28. Thus, the protrusions 136 make it possible to restrain the lens unit 11 from moving in the direction orthogonal to the optical axis P and hold the lens unit 11 to the camera body 132. Incidentally, it is advisable that the CCD housing 13 is configured to snap into engagement with the pair of protrusions 136, for example, with a click when it is inserted in the recess 28 in the front part.

The rear part 21 of the camera body 132 is configured in a manner similar to the first embodiment and has a lock 31 (which corresponds to a second lock) installed at its tip. Thus, the lock can be effected when the rear part 21 is closed over the front part 134 by turning.

With the digital camera 130 according to the third embodiment configured as described above, when the CCD housing 13 on the lens unit 11 is inserted in the recess 28 in the front part 134 of the camera body 132, the protrusions 136 of the front part 134 engage with the CCD housing 13, locking the CCD housing 13. Thus, after the CCD housing 13 is inserted in the recess 28, the user can lift the lens unit 11 by holding the camera body 132. In this state, the user activates the lock 31 by turning the rear part 21. Consequently, the lens unit 11 and camera body 132 are locked by the two types of locking device (i.e., the protrusions 136 and lock 31), ensuring more reliable coupling of the lens unit 11 and camera body 132.

Figure 12:
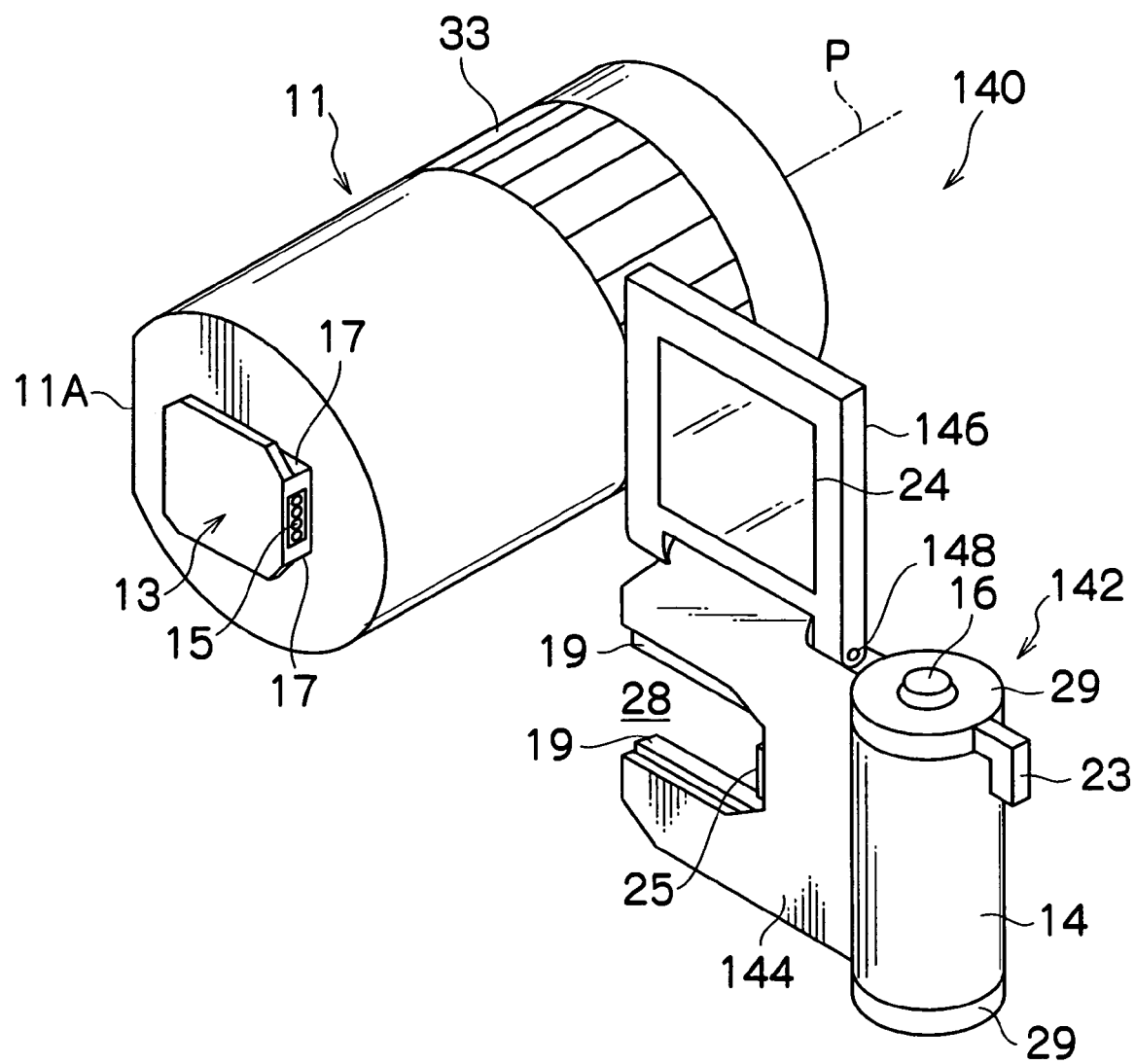
FIG. 12 is an assembly diagram of a digital camera according to a fourth embodiment.

Next, a fourth embodiment will be described with reference to FIG. 12. FIG. 12 is an assembly diagram of a digital camera according to the fourth embodiment.

The digital camera 140 according to the fourth embodiment shown in FIG. 12 differs from the digital camera 10 according to the first embodiment in configuration of a camera body 142. Specifically, in the camera body 142 according to the fourth embodiment, a rear part 146 is supported pivotally on a shaft 148 placed above a front part 144. The rear part 146 is designed to turn maintaining an appropriate frictional resistance. Also, it is designed to be able to stop and maintain its attitude at a desired pivotal position.

The liquid crystal monitor 24 is installed on the inner side of the rear part 146 (i.e., that side of the rear part 146 which faces the front part 144 when the rear part 146 is folded over the front part 144). Thus, when the rear part 146 is closed over the front part 144, the liquid crystal monitor 24 is hidden in the camera body 142. This protects the liquid crystal monitor 24.

With the digital camera 140 according to the fourth embodiment configured as described above, by stopping the rear part 146 of the camera body 142 at a desired pivotal position, it is possible to put the liquid crystal monitor 24 in a desired attitude. Thus, even if the digital camera 140 is held above or below the visual point of the photographer, by adjusting the attitude of the rear part 146, it is possible to adjust the attitude of the liquid crystal monitor 24 as desired so that it will be easily viewable.

Also, according to the fourth embodiment, since a space is provided around the CCD housing 13 when the rear part 146 is opened away from the front part 144, it is possible to efficiently dissipate heat generated in the CCD housing 13, and thereby prevent temperature rises in the CCD housing 13.

Furthermore, according to the fourth embodiment, since the liquid crystal monitor 24 is installed on the inner side of the rear part 146, the liquid crystal monitor 24 can be housed in the camera body 142 when the rear part 146 is closed over the front part 144. This protects the liquid crystal monitor 24.

Figure 13:
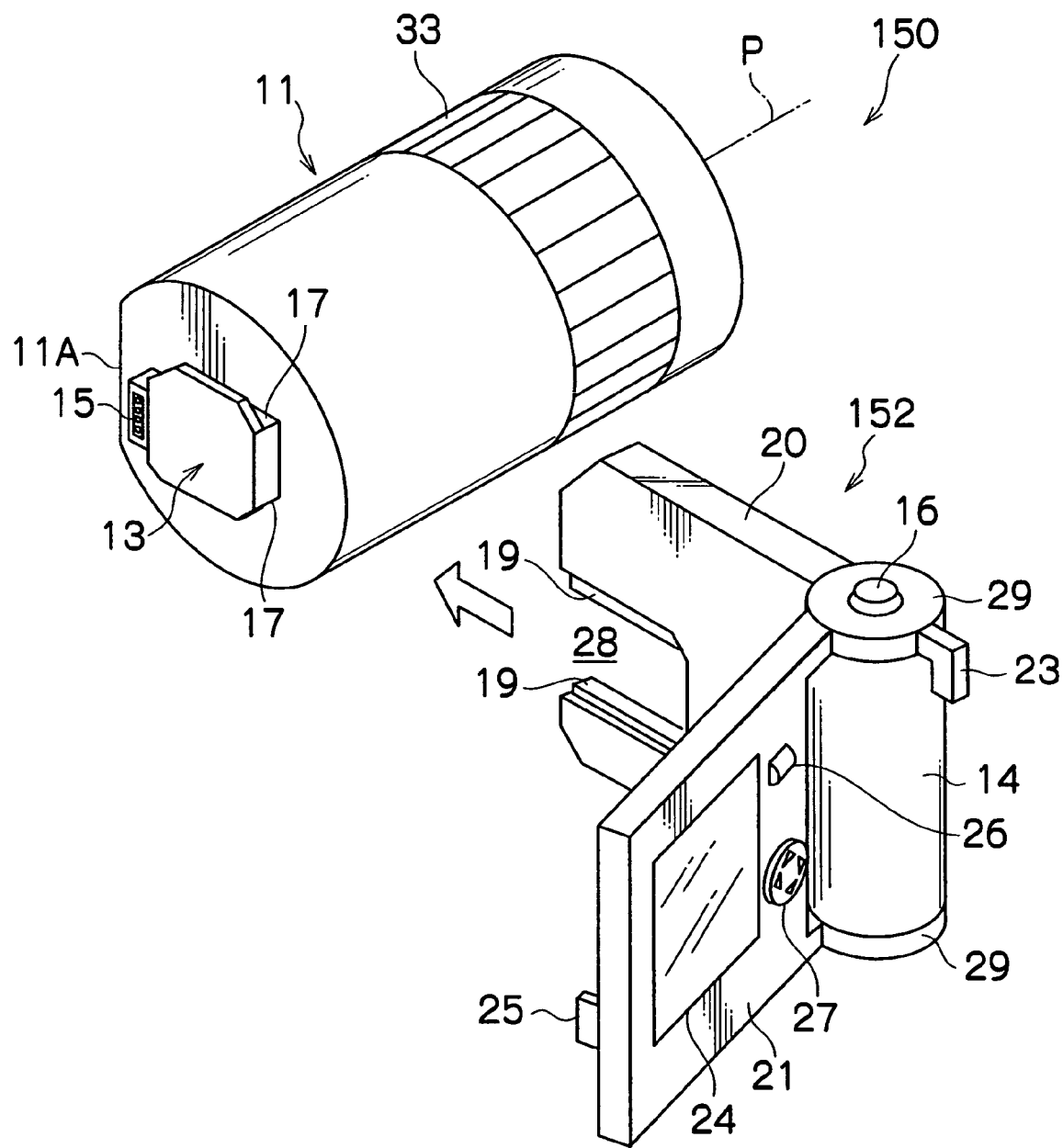
FIG. 13 is an assembly diagram of a digital camera according to a fifth embodiment.

Next, a digital camera according to a fifth embodiment will be described with reference to FIG. 13. FIG. 13 is an assembly diagram of the digital camera according to the fifth embodiment.

The digital camera 150 according to the fifth embodiment differs from the digital camera 10 according to the first embodiment in that a connector 25 is installed in the place of the lock 31 according to the first embodiment. Specifically, in the digital camera 150 according to the fifth embodiment, the connector 25 is installed, facing inward, near the inner front edge of the rear part 21 of a camera body 152. On the other hand, the lens unit 11 has a connector 15 installed adjacent to the CCD housing 13, where the connector 15 is intended to fit over the connector 25.

With the fifth embodiment configured as described above, after inserting the CCD housing 13 in the recess 28 in the camera body 152, the connector 25 is coupled with the connector 15 when a rear part 154 is closed by turning. This restrains the lens unit 11 from moving relative to the camera body 152 in the direction orthogonal to the optical axis P, thereby fastening the lens unit 11 to the camera body 152. Thus, according to the fifth embodiment, the connectors 15 and 25 combine locking devices which restrain movement of the camera body 152, eliminating the need to provide a separate locking device.

Incidentally, although in the first to fifth embodiments described above, the flat surface 11A is provided in lateral part of the lens unit 11 to prevent the lens unit 11 from rolling, this is not restrictive. For example, the lens unit 11 may be equipped with anti-rolling protrusions in lateral part or formed into a polygonal prism. Alternatively, the lens unit 11 may be attached and detached using a camera bag, clothing, or the like for holding the lens unit 11 in a predetermined attitude.

Also, although in the first to fifth embodiments described above, the CCD 54 is installed in the lens unit 11, this is not restrictive and the CCD 54 may be installed in the camera body 12.

Also, although in the first to fifth embodiments described above, the lens unit 11 and camera body 12 are fastened to each other by having their relative movement restrained by locking devices, they may be fastened by a fastening device such as an electromagnet installed separately.

What is claimed is:

1. An image pickup apparatus, comprising:
   a lens unit,
   a grip unit which can be attached and detached to/from the lens unit and forms all or a part of a grip when photographing,
   a guiding member which, being set on the lens unit, guides the grip unit in a direction approximately orthogonal to an optical axis of the lens unit;
   a guided member which is set on the grip unit and engaged with the guiding member; and
   a lock which, being disposed on the grip unit, restrains relative movement of the lens unit and the grip unit in the direction approximately orthogonal to the optical axis when the lens unit is mounted on the grip unit;
   wherein the lock is disposed pivotally on the grip unit.

2. An image pickup apparatus comprising:
   a lens unit,
   a grip unit which can be attached and detached to/from the lens unit and forms all or a part of a grip when photographing,
   a guiding member which, being set on the lens unit, guides the grip unit in a direction approximately orthogonal to an optical axis of the lens unit; and
   a guided member which is set on the grip unit and engaged with the guiding member;
   wherein the lens unit is equipped with an image pickup element, and
   wherein the lens unit and the grip unit are equipped with electrical contacts which are connected when the lens unit and the grip unit are coupled:
   wherein the grip unit includes a pivot hinge that allows a front member to pivot with respect to a rear member.

3. The image pickup apparatus according to claim 2, wherein grip unit includes a grip that bulges out cylindrically, and the pivot hinge is provided at the grip.

4. The image pickup apparatus according to claim 2, wherein the pivot hinge includes a lever.

5. The image pickup apparatus according to claim 4, wherein grip unit includes a grip that bulges out cylindrically, and the pivot hinge is provided at the grip.

6. An image pickup apparatus comprising:
   a lens unit,
   a grip unit which can be attached and detached to/from the lens unit and forms all or a part of a grip when photographing,
   a guiding member which, being set on the lens unit, guides the grip unit in a direction approximately orthogonal to an optical axis of the lens unit; and
   a guided member which is set on the grip unit and engaged with the guiding member;
   wherein the lens unit is equipped with an image pickup element, and
   wherein the lens unit and the grip unit are equipped with electrical contacts which are connected when the lens unit and the grip unit are coupled;
   wherein the grip unit includes a shaft that allows a front member to pivot with respect to a rear member.

* * * * *